(12) United States Patent
Arnold

(10) Patent No.: US 7,728,209 B1
(45) Date of Patent: Jun. 1, 2010

(54) STRINGED INSTRUMENT WIRELESS COMMUNICATION DEVICE AND METHOD OF USE

(75) Inventor: Thomas A. Arnold, Carlsbad, CA (US)

(73) Assignee: Kyocera Wireless Corp, San Diego, CA (US)

( * ) Notice: Subject to any disclaimer, the term of this patent is extended or adjusted under 35 U.S.C. 154(b) by 97 days.

(21) Appl. No.: 11/740,225

(22) Filed: Apr. 25, 2007

(51) Int. Cl.
*G10D 3/06* (2006.01)
*H04H 20/71* (2008.01)
*H04B 1/034* (2006.01)
*H04M 1/00* (2006.01)

(52) U.S. Cl. .......................... 84/29; 84/173; 84/314 R; 84/601; 84/602; 455/3.05; 455/3.06; 455/95; 455/128; 379/419; 379/428.01; 379/434; 379/440

(58) Field of Classification Search ............... 84/29, 84/722
See application file for complete search history.

(56) References Cited

U.S. PATENT DOCUMENTS

| | | | |
|---|---|---|---|
| 4,038,897 A * | 8/1977 | Murray et al. | 84/722 |
| 7,304,224 B1 * | 12/2007 | Bettis et al. | 84/293 |
| 2006/0027080 A1 | 2/2006 | Schultz | |
| 2007/0042746 A1 * | 2/2007 | Beard | 455/347 |
| 2008/0254824 A1 * | 10/2008 | Moraes | 455/556.1 |

* cited by examiner

*Primary Examiner*—Jeffrey Donels
*Assistant Examiner*—Christopher Uhlir

(57) ABSTRACT

A stringed instrument wireless communication device includes a wireless communication device housing including a front; graphical elements on the front corresponding to data to be input into the wireless communication device; and a stringed instrument keypad including a plurality of frets extending along the front of the wireless communication device housing and a plurality of strings extending substantially perpendicular to and above the plurality of frets. The graphical elements are respectively disposed on the front between frets and adjacent to the strings, and the stringed instrument keypad is configured to input data corresponding to a pressed string and a graphical element adjacent to the pressed string.

12 Claims, 3 Drawing Sheets

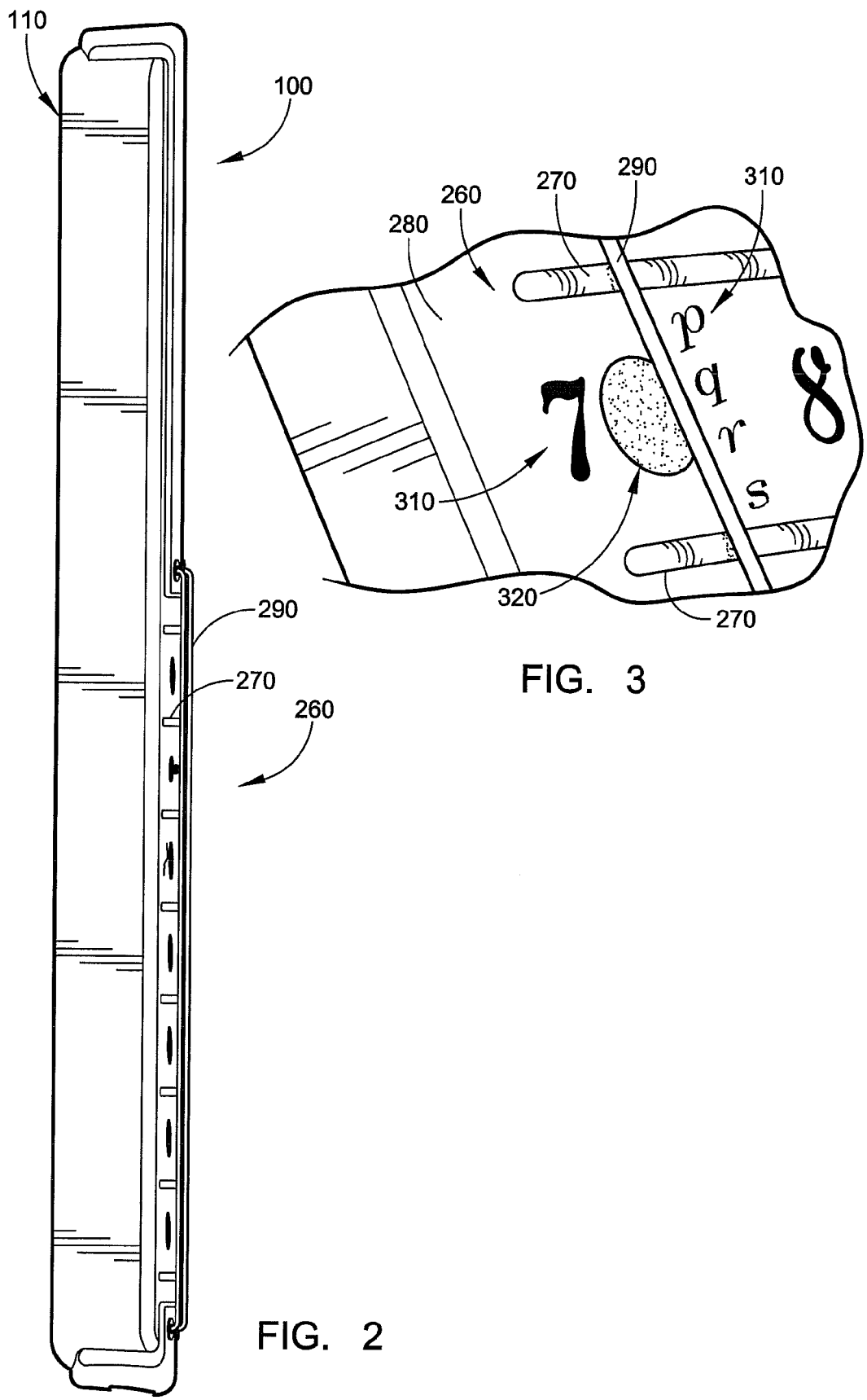

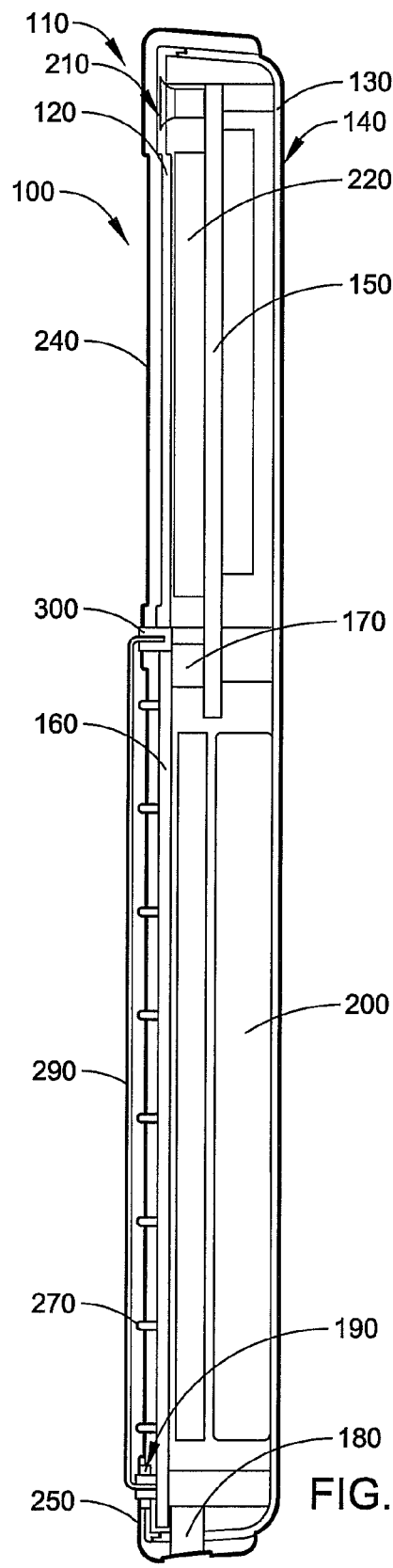
FIG. 4
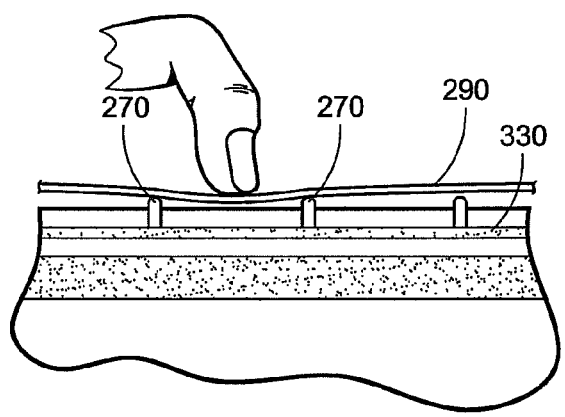
FIG. 5
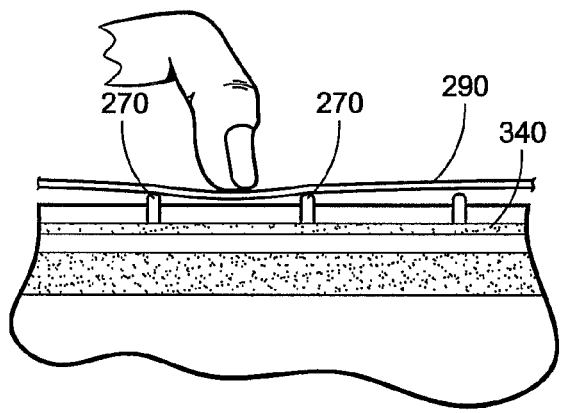
FIG. 6
STRING SIGNALS
| FRET SIGNALS | A | B | C |
|---|---|---|---|
| 1 | 1 | 2 | 3 |
| 2 | 4 | 5 | 6 |
| 3 | 7 | 8 | 9 |
| 4 | * | 0 | # |
FIG. 7

STRINGED INSTRUMENT WIRELESS COMMUNICATION DEVICE AND METHOD OF USE

FIELD OF THE INVENTION

The present invention relates to wireless communication devices and methods of using the same.

BACKGROUND

A number of relatively standard wireless communication device keypad technologies and designs exist in the marketplace. The standard keypad technologies and designs appeal to a wide variety of potential customers. A challenge for the developers of wireless communication devices is to come up with unique, innovative keypads that are functional and entice customers of a unique market segment to buy and use the wireless communication device.

SUMMARY

Accordingly, an aspect of the invention is a wireless communication device having a stringed instrument (e.g., guitar) theme. The wireless communication includes a keypad including a plurality of frets and a plurality of strings, similar to those found on a stringed instrument. The strings are disposed above the frets. Underneath the strings and between the frets are graphical elements (e.g., numbers 0-9) for indicating to the user where to contact the strings to enter input into the wireless communication device. In one embodiment, depressing a string above a graphical element causes the string to contact the adjacent frets. This action closes a switch, causing an electrical signal to be transmitted between the frets, through the portion of the string bridging the frets. The signal is read by the wireless communication device for determining the user's input. In an alternative embodiment, a capacitive switch is disposed in the wireless communication device housing and depressing a string between two frets above a graphical element a sufficient distance causes the capacitive switch to be activated, indicating to the wireless communication device the user's input.

Another aspect of the invention involves a stringed instrument wireless communication device including a wireless communication device housing having a front; graphical elements on the front corresponding to data to be input into the wireless communication device; and a stringed instrument keypad having a plurality of frets extending along the front of the wireless communication device housing and a plurality of strings extending substantially perpendicular to and above the plurality of frets. The graphical elements are respectively disposed on the front between frets and adjacent to the strings, and the stringed instrument keypad is configured to input data corresponding to a pressed string and a graphical element adjacent to the pressed string.

A further aspect of the invention involves a method of using a stringed instrument wireless communication device, the stringed instrument wireless communication device including a wireless communication device housing having a front; graphical elements on the front corresponding to data to be input into the wireless communication device; and a stringed instrument keypad including a plurality of frets extending along the front of the wireless communication device housing and a plurality of strings extending substantially perpendicular to and above the plurality of frets. The method includes receiving mechanical input in the form of a user pressing on one of the plurality of strings; receiving electrical signals corresponding to the mechanical input; determining if the electrical signals correspond to one of a predetermined number of input data; and storing input data corresponding to the electrical signals.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 2 is a side-elevational view of the stringed instrument wireless communication device of FIG. 1;

FIG. 3 is an enlarged partial perspective view of a portion of the stringed instrument wireless communication device of FIG. 1;

FIG. 4 is cross sectional view of the stringed instrument wireless communication device of FIG. 1;

FIG. 5 is an enlarged cross-sectional view of the stringed instrument wireless communication device of FIGS. 1 and 4;

FIG. 6 is an enlarged cross-sectional view of the stringed instrument wireless communication device of FIGS. 1 and 4, and illustrates an alternative embodiment of an input switch for the stringed instrument wireless communication device;

FIG. 7 is an exemplary fret and string matrix for the stringed instrument wireless communication device of FIG. 1.

DETAILED DESCRIPTION

Figure 1:
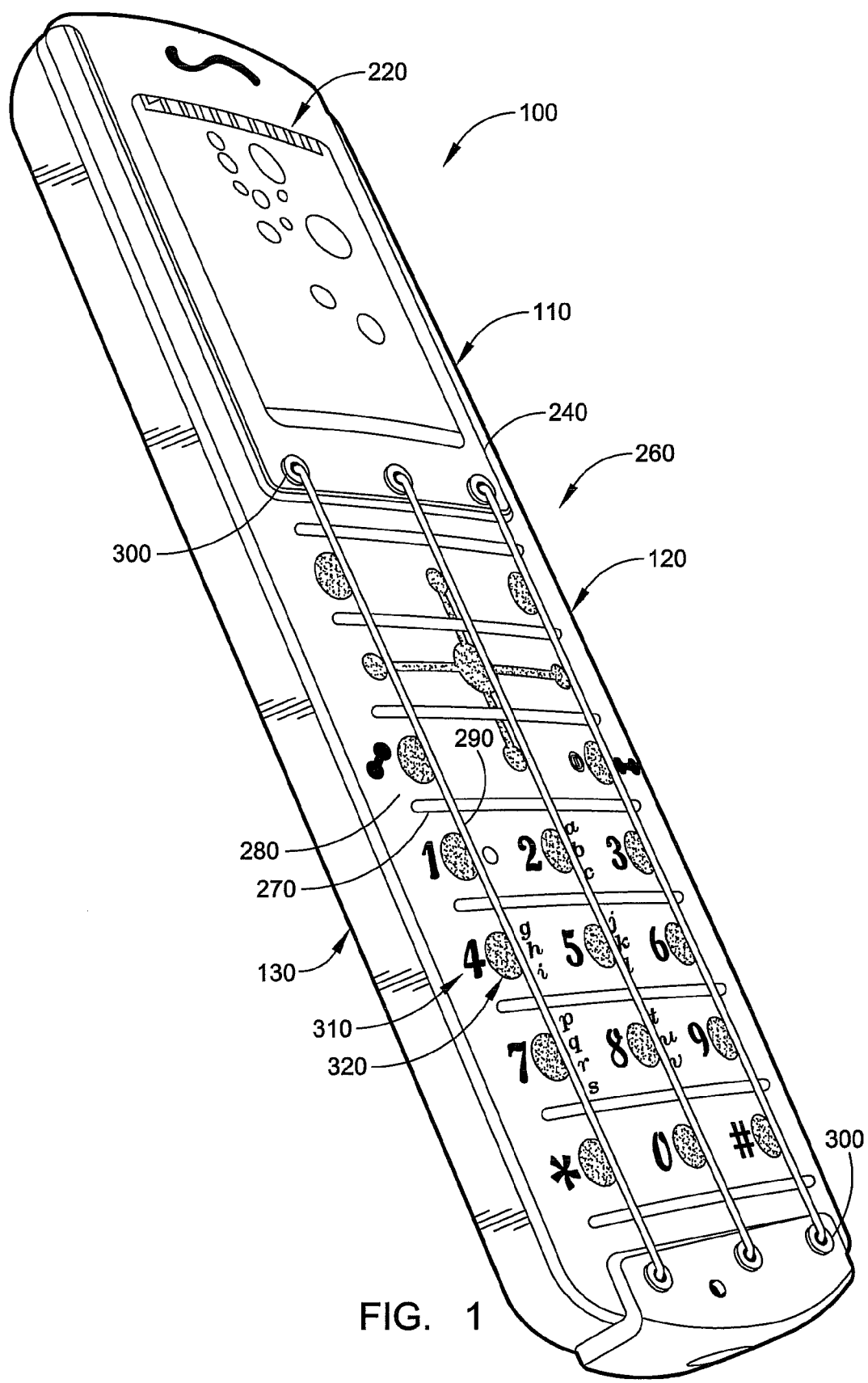
FIG. 1 is a perspective view of an embodiment of a stringed instrument wireless communication device.

Certain embodiments as disclosed herein provide for a stringed instrument wireless communication device including a keypad with a plurality of frets and a plurality of strings, similar to those found on a stringed instrument. Underneath the strings and between the frets are graphical elements (e.g., numbers 0-9) for indicating to the user where to contact the strings to enter input into the wireless communication device. The keypad allows a user to input data corresponding to an underlying graphical element by pressing the strings above the graphical element between adjacent frets. Although the keypad of the stringed instrument wireless communication device will be shown and described herein as including guitar strings and frets, in alternative embodiments, the keypad includes strings and/or frets corresponding to other stringed instruments including, but not by way of limitation, the violin, the banjo, the harp, and the cello.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

With reference to FIGS. 1-4, wireless communication device 100 includes rigid housing 110 having plastic front housing member 120 and plastic rear housing member 130 that fit together to enclose communication electronics 140, which generally include RF/antenna printed circuit board (PCB) 150, baseband/keypad printed circuit board (PCB) 160, PCB-to-PCB connector 170, interface connector 180, microphone 190, battery 200, receiver/loudspeaker 210, LCD display 220, and antenna (not shown). LCD display 220 is covered and protected by transparent plastic display lens 240. Bottom decorative plastic member 250 is attached to the bottom of housing 110.

The user listens to received audio signals from receiver/loudspeaker 210 and speaks through microphone 190. Display 220 provides menus, messaging, and a readout of user input data.

Stringed instrument keypad 260 includes spaced, narrow, elongated stainless steel frets 270 extending laterally along front 280 of front housing member 120. Frets 270 are partially disposed in front housing member 120 as shown in FIG. 4. Although eight frets 270 are shown, in alternative embodiments, other numbers of frets 270 are provided. In further embodiments, frets 270 have a different size, shape, configuration, and/or material. In a still further embodiment, stringed instrument keypad 260 does not have frets. Stringed keypad 260 also includes spaced metal guitar strings 280 extending perpendicular to and above frets 270. Although three strings 290 are shown, in alternative embodiments, other numbers of strings 290 are provided. Strings 290 are connected at one end by ferrules 300 to bottom decorative plastic member 250 and front housing member 120, and at an opposite end by ferrules 300 to a lower part of display lens 240 and front housing member 120. Below strings 290 and between frets 270, front 280 of front housing member 120 includes graphical elements (e.g., numbers 0-9, *, #, Enter, arrows, On, Off, letters a, b, c, etc.) 310 and keypad elements 320. In an alternative embodiment, stringed instrument keypad 260 does not include keypad elements 320.

With reference to FIG. 5, stringed instrument keypad 260 includes an elastomeric (Zebra) style compression connector 330 that provides an electrical link from frets 270 and strings 290 to baseband/keypad PCB 160.

With reference to FIG. 6, in an alternative embodiment of stringed instrument keypad 260, stringed instrument keypad 260 includes a capacitive touch pad layer 340. In further embodiments, stringed instrument keypad 260 includes resistive touch sensor(s) or inductive touch sensor(s).

With continuing reference to FIGS. 1-5, and especially FIGS. 3 and 5, a method of using the stringed instrument wireless communication device 100 will be described. To input a character (i.e., data) corresponding to graphical element 310 and/or keypad element 320 into stringed instrument wireless communication device 100, a user pushes down on a string 290 over the desired graphical element 310. For example, if the user desires to input the number seven "7", the user presses down on string 290 over keypad element 320 corresponding to the number seven "7" on front 280. Thus, mechanical input in the form of a user pressing on one of the plurality of strings 390 is received by stringed instrument keypad 260. When string 290 is depressed, string 290 contacts a pair of adjacent frets 270, electrically connecting frets 270 and closing a switch corresponding to the graphical element/data, the event of which can be detected by sensing circuitry (not shown) associated with keypad 260. In an alternative embodiment, contact with only a single fret 270 closes a switch corresponding to the graphical element/data. Low-voltage, low-current signals are passed through string 290 and close a "switch circuit" between adjacent frets 270. Elastomeric compression connector 330 provides an electrical signal link from frets 270 to baseband/keypad printed PCB 160. Thus, stringed instrument keypad 260 receives electrical signals corresponding to the mechanical input (i.e., pressing on strings 390 until strings 390 contact adjacent frets 270). The electrical signals corresponding to the closed "switch circuit" are processed by a controller of PCB 160 according to matrix (FIG. 7). The controller determines that a "switch circuit" corresponding to an A string (i.e., left-most string 290) and fret pair 3 (frets 270 immediately straddling seven "7", eight "8", and nine "9" row) was input into stringed instrument keypad 260. From the matrix, the controller determines that an A string signal and a fret pair 3 signal corresponds to the number seven "7", and the number seven "7" is considered the input corresponding to the detected input event; the input value "7" may also be stored into memory in stringed instrument wireless communication device 100 for further processing.

With reference to FIG. 6, in an embodiment where stringed instrument keypad 260 includes capacitive touch pad layer 340, when a user depresses string 290 above a graphical element 310 and string 290 comes within a detectable distance of capacitive touch pad layer 340, a capacitive sensitive switch corresponding to the graphical element is activated triggering an input detection event. After the input detection event, an electrical signal is transmitted to baseband/keypad printed PCB 160, and data corresponding to the activated capacitive switch is determined by the controller and, may be stored into memory in stringed instrument wireless communication device 100 for further processing. In this capacitive touch pad layer embodiment (or the resistive touch sensor or inductive touch sensor embodiments described above), frets 270 do not transmit electrical signals and, thus, are purely cosmetic. Moreover, in other embodiments, frets 270 can be omitted so that the keyboard arrangement mimics other stringed instruments that do not implement a fretted keyboard, such as acoustic base guitars, violins, cellos, and the like.

In another embodiment of the invention, one or software modules in the wireless communication device allow guitar strums (strums of strings 290) to play corresponding tones, music, and/or audio files. In a further embodiment of the invention, one or software modules in wireless communication device allow chords to be played on wireless communication device 100 and/or allow wireless communication device 100 to be used as a simplified instrument.

The stringed instrument wireless communication device provides a unique, innovative keypad that is both functional and enticing to use, especially by guitar users, stringed instrument users, and music fans.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A stringed instrument wireless communication device, comprising:
a wireless communication device housing including a front;

graphical elements on the front corresponding to data to be input into the wireless communication device;

a stringed instrument keypad including a plurality of frets extending along the front of the wireless communication device housing and a plurality of strings extending perpendicular to and above the plurality of frets, the graphical elements being disposed on the front between the frets and adjacent to and unobstructed by the strings, the stringed instrument keypad further configured to detect a pressed string and to determine input data corresponding to the pressed string based on the following matrix:

|             | STRING SIGNALS |   |    |
| ----------- | -- | -- | -- |
| FRET SIGNALS | A  | B  | C  |
| 1           | 1  | 2  | 3  |
| 2           | 4  | 5  | 6  |
| 3           | 7  | 8  | 9  |
| 4           | *  | 0  | #. |

2. The stringed instrument wireless communication device of claim 1, wherein the stringed instrument keypad includes means for detecting an electrical connection when the pressed string contacts a pair of adjacent frets.

3. The stringed instrument wireless communication device of claim 1, wherein the stringed instrument keypad includes means for detecting an electrical connection when the pressed string contacts at least one adjacent fret.

4. The stringed instrument wireless communication device of claim 1, wherein stringed instrument keypad includes a plurality of capacitive sensitive touch pads underneath the strings, each capacitive sensitive touch pad associated with a corresponding one of the graphical elements, and the stringed instrument keypad is configured to detect when the pressed string conies within a detectable distance of the one or more capacitive touch pads.

5. A method of using a stringed instrument wireless communication device, the stringed instrument wireless communication device including a wireless communication device housing having a front; graphical elements on the front corresponding to data to be input into the wireless communication device; and a stringed instrument keypad including a plurality of frets extending along the front of the wireless communication device housing and a plurality of strings extending perpendicular to and above the plurality of frets, wherein the graphical elements are unobstructed by the strings, the method comprising:

receiving mechanical input in the form of a user pressing on one of the plurality of strings;

detecting electrical signals corresponding to the mechanical input;

determining if the electrical signals correspond to one of a predetermined number of input data based on the following matrix:

|             | STRING SIGNALS |   |    |
| ----------- | -- | -- | -- |
| FRET SIGNALS | A  | B  | C  |
| 1           | 1  | 2  | 3  |
| 2           | 4  | 5  | 6  |
| 3           | 7  | 8  | 9  |
| 4           | *  | 0  | #; | storing input data corresponding to the electrical signals.

6. The method of claim 5, wherein receiving mechanical input in the form of a user pressing on one of the plurality of strings includes receiving mechanical input in the form of a user pressing on one of the plurality of strings so that the string being pressed contacts a pair of adjacent frets, receiving electrical signals corresponding to the mechanical input includes transmitting electrical signals through the adjacent frets and pressed string; and determining if the electrical signals correspond to one of a predetermined number of input data includes determining that the transmitted signals through the adjacent frets and pressed string correspond to a closed switch condition for selected input data; and storing input data corresponding to the electrical signals includes storing the selected input data corresponding to the closed switch condition.

7. The method of claim 5, wherein receiving mechanical input in the form of a user pressing on one of the plurality of strings includes receiving mechanical input in the form of a user pressing on one of the plurality of strings so that the string being pressed contacts a fret adjacent a graphical element adjacent to the pressed string, receiving electrical signals corresponding to the mechanical input includes transmitting electrical signals through the contacted fret and pressed string; and determining if the electrical signals correspond to one of a predetermined number of input data includes determining that the transmitted signals through the contacted fret and pressed string correspond to a closed switch condition for selected input data; and storing input data corresponding to the electrical signals includes storing the selected input data corresponding to the closed switch condition.

8. The method of claim 5, wherein receiving mechanical input in the form of a user pressing on one of the plurality of strings includes receiving mechanical input in the form of a user pressing on one of the plurality of strings so that the string being pressed comes within a detectable distance of one or more capacitive touch pads in the stringed instrument keypad, receiving electrical signals corresponding to the mechanical input includes receiving electrical signals indicating that the one or more capacitive touch pads are activated, and determining if the electrical signals correspond to one of a predetermined number of input data includes determining input data corresponding to the one or more activated capacitive touch pads, and storing input data corresponding to the electrical signals includes storing the input data corresponding to the one or more activated capacitive touch pads.

9. A stringed instrument wireless communication device, comprising:

a housing including a front member and a rear member;

a plurality of communication electronics including a display; and a stringed instrument keypad including a plurality of frets extending along the front of the wireless communication device housing and a plurality of strings extending perpendicular to and above the plurality of frets, the stringed instrument keypad configured to detect a pressed string and to determine input data corresponding to the pressed string based on the following matrix:

|             | STRING SIGNALS |   |   |
| ----------- | -- | -- | -- |
| FRET SIGNALS | A  | B  | C |
| 1           | 1  | 2  | 3 |
| 2           | 4  | 5  | 6 |

-continued

| FRET SIGNALS | STRING SIGNALS | | |
|---|---|---|---|
| | A | B | C |
| 3 | 7 | 8 | 9 |
| 4 | * | 0 | #, | wherein the front member and rear member fit together to enclose the communication electronics and wherein the communication electronics process the input data corresponding to the pressed string.

10. The stringed instrument wireless communication device of claim 9, wherein the communication electronics are selected from the group consisting of an RF/antenna printed circuit board, a baseband/keypad printed circuit board, a printed circuit board-to-printed circuit board connector, an interface connector, a microphone, a battery, a receiver/loudspeaker, and an antenna.

11. The stringed instrument wireless communication device of claim 10, wherein a user listens to the processed input data from the receiver/loudspeaker.

12. The stringed instrument wireless communication device of claim 9, wherein the display is a liquid crystal display which provides menus, messaging, and a readout of the processed input data.

* * * * *